(12) United States Patent
McKie et al.

(10) Patent No.: US 10,197,344 B2
(45) Date of Patent: *Feb. 5, 2019

(54) DETECTING AND CORRECTING ENTHALPY WHEEL FAILURE MODES

(71) Applicant: Lennox Industries Inc., Richardson, TX (US)

(72) Inventors: Justin McKie, Frisco, TX (US); Eric Perez, Hickory Creek, TX (US); Greg Thomas, McKinney, TX (US); Steve Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/192,608

(22) Filed: Jun. 24, 2016

(65) Prior Publication Data

US 2016/0305723 A1    Oct. 20, 2016

Related U.S. Application Data

(63) Continuation of application No. 13/267,542, filed on Oct. 6, 2011, now Pat. No. 9,404,668.

(51) Int. Cl.
*G06F 19/00* (2018.01)
*F28F 27/00* (2006.01)
(Continued)

(52) U.S. Cl.
CPC ............. *F28F 27/006* (2013.01); *F24F 11/30* (2018.01); *F24F 11/62* (2018.01); *F24F 11/77* (2018.01); *F24F 12/006* (2013.01); *F28D 19/041* (2013.01); *F24F 11/32* (2018.01); *F24F 2110/40* (2018.01); *F24F 2203/10* (2013.01); *F24F 2203/104* (2013.01); *Y02B 30/563* (2013.01); *Y10T 29/4935* (2015.01)

(58) Field of Classification Search
CPC .......... F24F 27/006; F24F 11/77; F24F 11/62; F24F 11/30; F24F 12/006; F24F 2110/40; F24F 11/32; F24F 2203/104; Y02B 30/563

See application file for complete search history.

(56) References Cited

U.S. PATENT DOCUMENTS

| | | |
|---|---|---|
| 1,094,309 A | 4/1914 | Daw |
| 3,252,508 A | 5/1966 | Goettl |

(Continued)

OTHER PUBLICATIONS

ANSI/AHRI Standard 1060, 2005 Standard for Performance Rating of Air-to-Air Exchangers for Energy Recovery Ventilation, 13 pages.

(Continued)

*Primary Examiner* — Michael D Masinick
(74) *Attorney, Agent, or Firm* — Baker Botts L.L.P.

(57) ABSTRACT

A heating ventilation and cooling system includes an energy recovery ventilator (ERV). The ERV is configured to produce an inlet airstream and an exhaust airstream. An enthalpy wheel within the energy recovery ventilator is operable to transport heat between the inlet and exhaust airstreams. A pressure transducer is configured to determine a backpressure across the enthalpy wheel. A controller is configured to determine, in response to the backpressure, an operational characteristic of the enthalpy wheel.

7 Claims, 7 Drawing Sheets

(51) Int. Cl.

| | |
|---|---|
| *F28D 19/04* | (2006.01) |
| *F24F 12/00* | (2006.01) |
| *F24F 11/30* | (2018.01) |
| *F24F 11/62* | (2018.01) |
| *F24F 11/77* | (2018.01) |
| *F24F 110/40* | (2018.01) |
| *F24F 11/32* | (2018.01) |

(56) References Cited

U.S. PATENT DOCUMENTS

| | | | |
|---|---|---|---|
| 3,889,742 A | 6/1975 | Rush | |
| 4,018,266 A | 4/1977 | Kay | |
| 4,060,913 A | 12/1977 | Yoshida | |
| 4,228,849 A | 10/1980 | Heinola | |
| 4,281,522 A | 8/1981 | Bussjager | |
| 4,342,359 A | 8/1982 | Baker | |
| 4,497,361 A | 2/1985 | Hajicek | |
| 4,611,653 A | 9/1986 | Ikemura | |
| 4,727,931 A | 3/1988 | Berner | |
| 4,754,651 A | 7/1988 | Shortridge | |
| 4,784,212 A | 11/1988 | Brimer | |
| 4,825,936 A | 5/1989 | Hoagland | |
| 4,834,004 A | 5/1989 | Butuk | |
| 4,841,733 A | 6/1989 | Dussault | |
| 4,843,838 A | 7/1989 | Trask | |
| 4,854,726 A | 8/1989 | Lesley | |
| 4,873,649 A | 10/1989 | Grald | |
| 5,062,280 A | 11/1991 | Martin, Sr. | |
| 5,069,272 A | 12/1991 | Chagnot | |
| 5,173,922 A | 12/1992 | Arakawa | |
| 5,183,098 A | 2/1993 | Chagnot | |
| 5,238,052 A | 8/1993 | Chagnot | |
| 5,316,073 A | 5/1994 | Klaus | |
| 5,372,182 A | 12/1994 | Gore | |
| 5,376,045 A | 12/1994 | Kiser | |
| 5,423,187 A | 6/1995 | Fournier | |
| 5,482,108 A | 1/1996 | Essle | |
| 5,497,823 A | 3/1996 | Davis | |
| 5,515,909 A | 5/1996 | Tanaka | |
| 5,564,626 A | 10/1996 | Kettler | |
| 5,726,424 A | 3/1998 | Koether | |
| 5,728,289 A | 3/1998 | Kirchnavy | |
| 5,761,908 A | 6/1998 | Oas | |
| 5,826,641 A | 10/1998 | Bierwirth | |
| 5,839,096 A | 11/1998 | Lyons | |
| 5,927,096 A | 7/1999 | Piccione | |
| 6,009,763 A | 1/2000 | Berckmans | |
| 6,039,109 A | 3/2000 | Chagnot | |
| 6,209,622 B1 | 4/2001 | Lagace | |
| 6,223,544 B1 | 5/2001 | Seem | |
| 6,289,974 B1 | 9/2001 | DeGregoria | |
| 6,319,114 B1 | 11/2001 | Nair | |
| 6,328,095 B1 | 12/2001 | Felber | |
| 6,355,091 B1 | 3/2002 | Felber | |
| 6,415,616 B1 | 7/2002 | Kim | |
| 6,575,228 B1 | 6/2003 | Ragland | |
| 6,672,627 B1 | 1/2004 | Mariman | |
| 6,776,708 B1 | 8/2004 | Daoutis | |
| 6,880,619 B1 | 4/2005 | Suzukawa | |
| 6,925,999 B2 | 8/2005 | Hugghins | |
| 6,929,057 B1 | 8/2005 | Sahota | |
| 7,012,516 B2 | 3/2006 | Laurosch | |
| 7,073,566 B2 | 7/2006 | Lagace | |
| 7,090,000 B2 | 8/2006 | Taylor | |
| 7,100,634 B2 | 9/2006 | Robb | |
| 7,231,967 B2 | 6/2007 | Haglid | |
| 7,308,384 B2 | 12/2007 | Shah | |
| 7,440,864 B2 | 10/2008 | Otto | |
| 7,458,228 B2 | 12/2008 | Lagace | |
| 7,716,936 B2 | 5/2010 | Bailey | |
| 7,841,381 B2 | 11/2010 | Chagnot | |
| 7,856,289 B2 | 12/2010 | Schanin | |
| 7,886,986 B2 | 2/2011 | Fischer, Jr. | |
| 8,029,608 B1 | 10/2011 | Breslin | |
| 8,123,518 B2 | 2/2012 | Nordberg | |
| 9,115,909 B2 * | 8/2015 | McKie | F24F 11/0086 |
| 9,206,991 B2 * | 12/2015 | McKie | F24F 3/1423 |
| 9,283,518 B2 * | 3/2016 | Ehrenberg | B01D 53/268 |
| 9,404,668 B2 * | 8/2016 | McKie | F28F 27/006 |
| 9,791,163 B2 * | 10/2017 | McKie | F24F 11/0086 |
| 9,835,353 B2 * | 12/2017 | McKie | F24F 12/001 |
| 9,891,005 B2 * | 2/2018 | Rich | F28D 19/041 |
| 2002/0139514 A1 | 10/2002 | Lagace | |
| 2002/0153133 A1 | 10/2002 | Haglid | |
| 2003/0085814 A1 | 5/2003 | Griep | |
| 2003/0140638 A1 | 7/2003 | Arshansky | |
| 2003/0178411 A1 | 9/2003 | Manganiello | |
| 2004/0155466 A1 | 8/2004 | Sodemann | |
| 2005/0236150 A1 | 10/2005 | Chagnot | |
| 2005/0252229 A1 | 11/2005 | Moratalla | |
| 2006/0035580 A1 | 2/2006 | Anderson | |
| 2006/0054302 A1 | 3/2006 | Cho | |
| 2006/0219381 A1 | 10/2006 | Lagace | |
| 2007/0012052 A1 | 1/2007 | Butler | |
| 2007/0045439 A1 | 3/2007 | Wolfson | |
| 2007/0045601 A1 | 3/2007 | Rhee | |
| 2007/0144187 A1 | 6/2007 | Lee | |
| 2007/0171647 A1 | 7/2007 | Artwohl | |
| 2007/0205297 A1 | 9/2007 | Finkam | |
| 2007/0234748 A1 | 10/2007 | Alvord | |
| 2008/0017347 A1 | 1/2008 | Chung | |
| 2008/0033599 A1 | 2/2008 | Aminpour | |
| 2008/0072450 A1 | 3/2008 | Kim | |
| 2008/0076346 A1 | 3/2008 | Ahmed | |
| 2008/0144238 A1 | 6/2008 | Cline | |
| 2008/0208531 A1 | 8/2008 | Felcman | |
| 2008/0282494 A1 | 11/2008 | Won | |
| 2009/0032604 A1 | 2/2009 | Miller | |
| 2009/0090117 A1 | 4/2009 | McSweeney | |
| 2009/0095096 A1 | 4/2009 | Dean | |
| 2009/0120111 A1 | 5/2009 | Taras | |
| 2009/0156966 A1 | 6/2009 | Kontschieder | |
| 2009/0165644 A1 | 7/2009 | Campbell | |
| 2009/0215375 A1 | 8/2009 | Hagensen | |
| 2009/0222139 A1 | 9/2009 | Federspiel | |
| 2009/0304505 A1 | 12/2009 | Wobben | |
| 2010/0262298 A1 | 10/2010 | Johnson | |
| 2011/0189937 A1 | 8/2011 | Hasegawa | |
| 2013/0090051 A1 | 4/2013 | McKie | |
| 2013/0090769 A1 | 4/2013 | McKie | |
| 2013/0092344 A1 | 4/2013 | McKie | |
| 2013/0092345 A1 | 4/2013 | McKie | |
| 2013/0092346 A1 | 4/2013 | McKie | |
| 2013/0095744 A1 | 4/2013 | McKie | |
| 2013/0118188 A1 | 5/2013 | McKie | |
| 2013/0158719 A1 | 6/2013 | McKie | |

OTHER PUBLICATIONS

Lennox Engineering Data, Indoor Air Quality ERV Energy Recovery Ventilator 60 HZ, Bulletin No. 210245, Mar. 2010, 20 pages.

* cited by examiner

DETECTING AND CORRECTING ENTHALPY WHEEL FAILURE MODES

CROSS REFERENCE TO RELATED APPLICATIONS

This application is a continuation of U.S. patent application Ser. No. 13/267,542 filed Oct. 6, 2011 and entitled "Detecting and Correcting Enthalpy Wheel Failure Modes," which is incorporated herein by reference.

TECHNICAL FIELD

This application is directed, in general, to a heating, ventilation and air conditioning (HVAC) system, and, more specifically, to a system and method for improved detection and correction of operating failure modes.

BACKGROUND

Heating, ventilating and air conditioning (HVAC) systems are used extensively in residential and commercial installations. Some such systems include a fresh air ventilator that provides a means to replace a portion of stale air within a building being heated or cooled with fresh air from outside the building. While such ventilation provides the ability to maintain indoor air quality, the venting of heated or cooled air to the outside represents a potential loss of energy used to condition the vented air.

In an effort to improve the economy of operating such systems, energy may be transferred between an incoming fresh airstream and a vented airstream by use of an enthalpy wheel. A typical enthalpy wheel includes a medium that can store and release heat, and may also store and release moisture. Thus, for example, when a building is being heated, heat from a vented airstream may be transferred to an incoming cold fresh airstream, thereby recovering a portion of the energy that would otherwise be lost to the outside environment.

While providing increased efficiency, an enthalpy wheel may in some circumstances become clogged with, e.g. dirt or frost. Such clogging may result in a maintenance nuisance and increased cost to the operator from system down time and removing the blockage.

Accordingly, what is needed in the art is a solution to enthalpy wheel blockage that reduces the burden on the operator and decreases HVAC system down time.

SUMMARY

One aspect provides a heating ventilation and cooling system that includes an energy recovery ventilator (ERV). The ERV is configured to produce an inlet airstream and an exhaust airstream. An enthalpy wheel within the energy recovery ventilator is operable to transport heat between the inlet and exhaust airstreams. A pressure transducer is configured to determine a backpressure across the enthalpy wheel. A controller is configured to determine, in response to the backpressure, an operational characteristic of the enthalpy wheel.

Another aspect provides a method of controlling an HVAC system. The method includes measuring an air pressure within an energy recovery ventilator. An operational characteristic of an enthalpy wheel located within the energy recovery ventilator is determined in response to the air pressure.

Yet another aspect provides a method of manufacturing an HVAC system. In one step first and second blowers of an energy recovery ventilator are configured to provide an inlet airstream and an exhaust airstream. In another step an enthalpy wheel is located within the energy recovery ventilator. The enthalpy wheel is operable to transport heat between the inlet and exhaust airstreams. In another step a pressure transducer is configured to determine a backpressure across the enthalpy wheel. In another step a controller is configured to determine an operational characteristic of the enthalpy wheel in response to the backpressure.

BRIEF DESCRIPTION

Reference is now made to the following descriptions taken in conjunction with the accompanying drawings, in which.

DETAILED DESCRIPTION

This disclosure benefits from the innovative recognition by the inventors that measured pressure within an energy recovery ventilator (ERV) may be used to determine various operating conditions of the ERV. Knowledge of these operating conditions, such as a blocked or inoperable enthalpy wheel, may be used to operate the ERV to, e.g. unblock the enthalpy wheel and/or modify the operation of the ERV and/or generate an alarm condition indicating the need for service. Thus, service calls may be reduced and in some cases eliminated, reducing the cost of maintaining the ERV.

Figure 1:
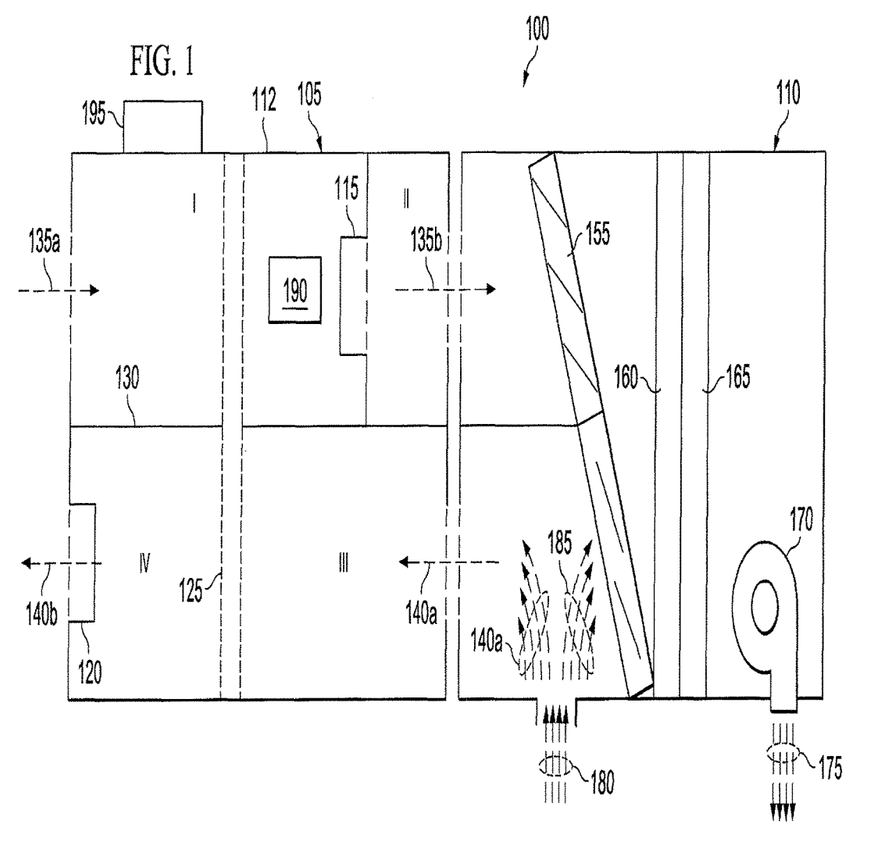
FIG. 1 illustrates an HVAC system according to one embodiment, including an energy recovery ventilator (ERV) and a rooftop unit (RTU)

Turning to FIG. 1, illustrated is an HVAC system 100 according to one embodiment. The system 100 includes an ERV 105 and a conditioning unit 110, e.g. a rooftop unit (RTU), sometimes referred to herein as an air conditioning unit 110. As used herein a conditioning unit is a climate control system configured to provide heating and/or cooling to a structure such as, without limitation, a residential or commercial building. While some aspects of the system 100 may be discussed in the context of an RTU, the scope of the disclosure contemplates other HVAC applications that are not rooftop mounted.

The ERV 105 includes an enclosure (e.g. a metal cabinet) 112, first and second variable speed blowers 115 and 120, an enthalpy wheel 125 and a divider 130. The blowers 115, 120 may be of any conventional or novel type, such as radial or axial, impeller- or propeller-types. The blowers 115 and 120 as illustrated are configured in a pull-pull configuration, but embodiments of the system 100 are not limited thereto. The blower 115 may be referred to herein as an inlet blower, and the blower 120 may be referred to herein as an exhaust blower. The enthalpy wheel 125 may also be conventional or novel. Without limitation to any particular type of enthalpy wheel, those skilled in the pertinent art will appreciate that enthalpy wheels typically include a heat and/or moisture transfer medium that provides a semi-permeable barrier to airflow therethrough.

In the illustrated embodiment the enthalpy wheel 125 and the divider 130 divide the ERV 105 into four zones, I, II, III and IV. The blower 115 operates to draw an inlet airstream 135a from outside the enclosure 112 into zone I. The incoming air may be, e.g. outside air. As used herein outside air is air that is initially external to the ERV 105 and an enclosed space (such as a building) that is environmentally conditioned by the system 100. The airstream 135a passes through the enthalpy wheel 125 and enters zone II. Air within zone II may exit the ERV 105 via an unreferenced outlet as an airstream 135b.

The ERV 105 receives an exhaust airstream 140a from the conditioning unit 110 into zone III. The blower 120 draws the airstream 140a through the enthalpy wheel 125 to zone IV. The exhaust air exits zone IV via another unreferenced outlet.

In the illustrated embodiment the ERV 105 is joined to the conditioning unit 110 such that the ERV 105 provides the airstream 135b to an unreferenced intake of the conditioning unit 110. The ERV 105 also receives the airstream 140a from the conditioning unit 110 via an unreferenced exhaust outlet of the conditioning unit 110.

The conditioning unit 110 includes an economizer 155, a cooling element 160, a heating element 165 and a blower 170. The blower operates to force an airstream 175 into the building being conditioned via an unreferenced supply duct. A return airstream 180 from the building enters the conditioning unit 110 at an unreferenced return duct.

A first portion 185 of the airstream 180 recirculates through the economizer 155 and joins the airstream 135b to provide supply air to the building. A second portion of the airstream 180 enters zone III of the ERV 105 and becomes the airstream 140a.

The economizer 155 may operate conventionally to vent a portion of the return airstream 180 and replace the vented portion with the airstream 135b. Thus air quality characteristics such as $CO_2$ concentration and humidity may be maintained within defined limits within the building being conditioned.

In some embodiments the blowers 115, 120 may be configured in a push-push configuration. In such embodiments, the blower 115 may be located at the fresh air inlet to zone I of the ERV 105. The blower 120 may be located at the exhaust air inlet to zone III.

Figure 2A:
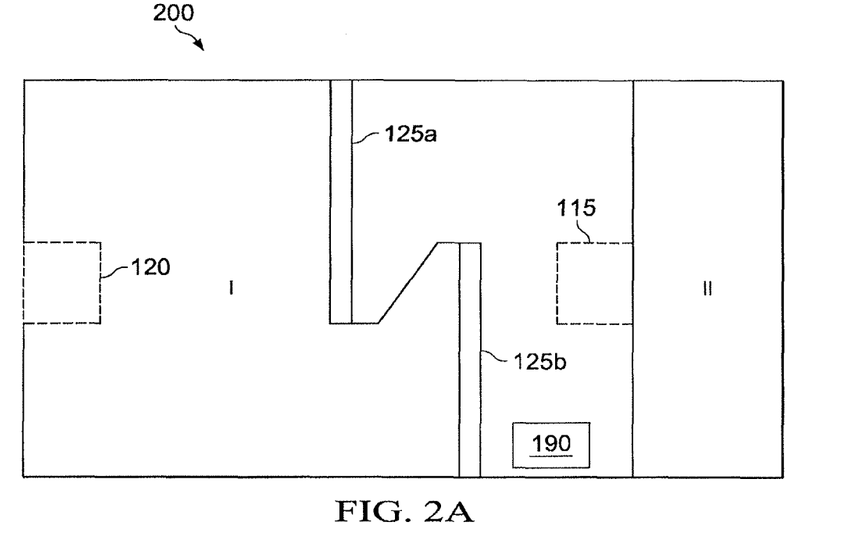
FIGS. 2A and 2B respectively show top and side views of an illustrative ERV according to one embodiment, in which the ERV includes two enthalpy wheels.
Figure 2B:
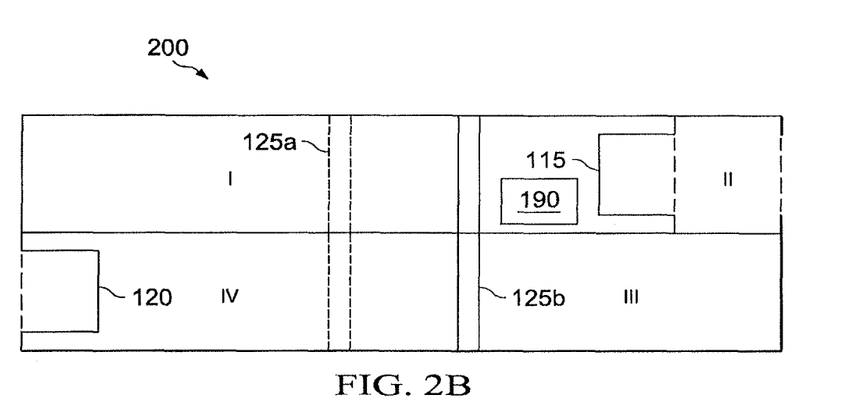

FIGS. 2A and 2B respectively illustrate top and side views of an illustrative embodiment of an ERV 200 that includes two enthalpy wheels 125a and 125b. In such embodiments the enthalpy wheels may provide the ability to reduce the height of the ERV 200 cabinet relative to single-wheel embodiments while maintaining about the same airflow capacity. Dual-wheel embodiments may also provide redundancy of enthalpy wheel function so that in if one enthalpy drive motor fails, the remaining enthalpy wheel can still provide some benefit. Aspects of control of dual-wheel ERV embodiments are discussed further below.

Figure 3:
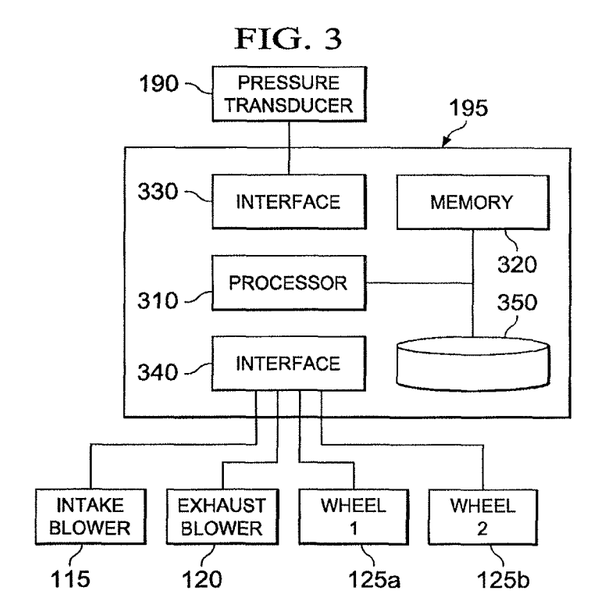
FIG. 3 illustrates a controller according to one embodiment, in which the controller is configured to control an ERV having two enthalpy wheels, e.g. the ERV of FIG. 2, responsive to a measured pressure within the ERV.

FIG. 3 illustrates aspects of the controller 195 in an illustrative and nonlimiting embodiment. The controller 195 is illustrated without limitation controlling the operation of the two enthalpy wheels 125a and 125b. The controller 195 also controls the operation of the blowers 115, 120 in the illustrated embodiment.

The controller 195 includes a processor 310, an instruction memory 320, an input interface 330, an output interface 340 and a database 350. The processor 310 may be any type of processor or state machine suited to electronic control systems. The processor 310 may be analog or digital, and is described without limitation as a digital controller. In an illustrative example, without limitation thereto, the processor 310 is a commercially available microcontroller.

The memory 320 stores operating instructions for the processor 310. The operating instructions include instructions to implement the control functions that operate the system 100 according to various embodiments described herein. The memory 320 may also include various instructions related to general operation of the system 100 unrelated to the ERV 105. The memory 320 may include one or more electronic components distinct from the processor 310, or may be partially or wholly embedded within the processor 310.

The input interface 330 is configured to convert an electrical output from the pressure transducer 190 to a form that is readable by the processor 310. The interface 330 may include any type of conversion devices, such as without limitation an analog-to-digital converter (ADC), current to voltage converter, voltage to current converter, or amplifier. In some embodiments the interface 330 is partially or wholly embedded within the processor 310.

The output interface 340 is configured to convert an electrical output from the processor 310 to a form suitable for operating the blowers 115 and 120, and the enthalpy wheels 125a and 125b. For example, the output interface 340 may produce a DC voltage proportional to a desired blower speed, and may power a drive motor coupled to each of the enthalpy wheels 125a, 125b. The interface 340 may include any type of conversion devices, such as without limitation a digital-to-analog converter (DAC), current to voltage converter, voltage to current converter, power transistor, or amplifier. In some embodiments the interface 340 is partially or wholly embedded within the processor 310.

In various embodiments the pressure transducer 190 reports an absolute pressure of the zone within which it is located. The controller 195 may be configured to control the blowers 115, 120 to maintain an absolute pressure set point that is stored in the memory 320 or otherwise communicated to the controller 195. In other embodiments the controller determines a differential pressure $\Delta P$ between the pressure reported by the pressure transducer 190 and the outside air. The outside air pressure value may be stored as a static value, may be determined by a second pressure transducer (not shown), or measured by the controller 195 when the blowers 115, 120 and 170 are all off.

The database 350 in some embodiments includes data that correlates pressure across one or both enthalpy wheels 125a, 125b with the rate of airflow through the one or both enthalpy wheels. This aspect is described in additional detail below. In some embodiments an anemometer (not shown) may provide a direct reading of airflow through the enthalpy wheels 125a, 125b.

The memory 320 also includes instructions configured to implement one or more routines (described below) to determine, in response to the backpressure across one or both of the enthalpy wheels 125a, 125b, an operational characteristic of the one or both enthalpy wheels. Such instructions may be in any form appropriate to the processor 310, e.g. machine code, interpreted higher-level code, or state machine instructions.

FIGS. 4-8 respectively illustrate methods 400, 500, 600, 700 and 800 for controlling the system 100 in illustrative embodiments. These methods 400-800, which may be referred to synonymously as routines 400-800, may be implemented, e.g. in code stored by the memory 320. The methods 400-800 may be subroutines of a control algorithm configured to provide overall control of the system 100. The routines 400-800 are described without limitation below as being invoked by a calling routine. Those skilled in the pertinent art will appreciate that the methods 400-800 may include steps other than those shown, and that some of the steps in the methods 400-800 may be performed in a different order than the illustrated order, or may be omitted. The methods 400-800 are described without limitation by reference to the features of the system 100 and/or the system 200. More specifically, in some cases the methods 400-800 are described for operation of two enthalpy wheels, e.g. the enthalpy wheels 225a and 225b of the ERV 200. Those skilled in the pertinent art are capable of modifying the methods for operation of a system having a single enthalpy wheel, such as the ERV 105.

Figure 4:
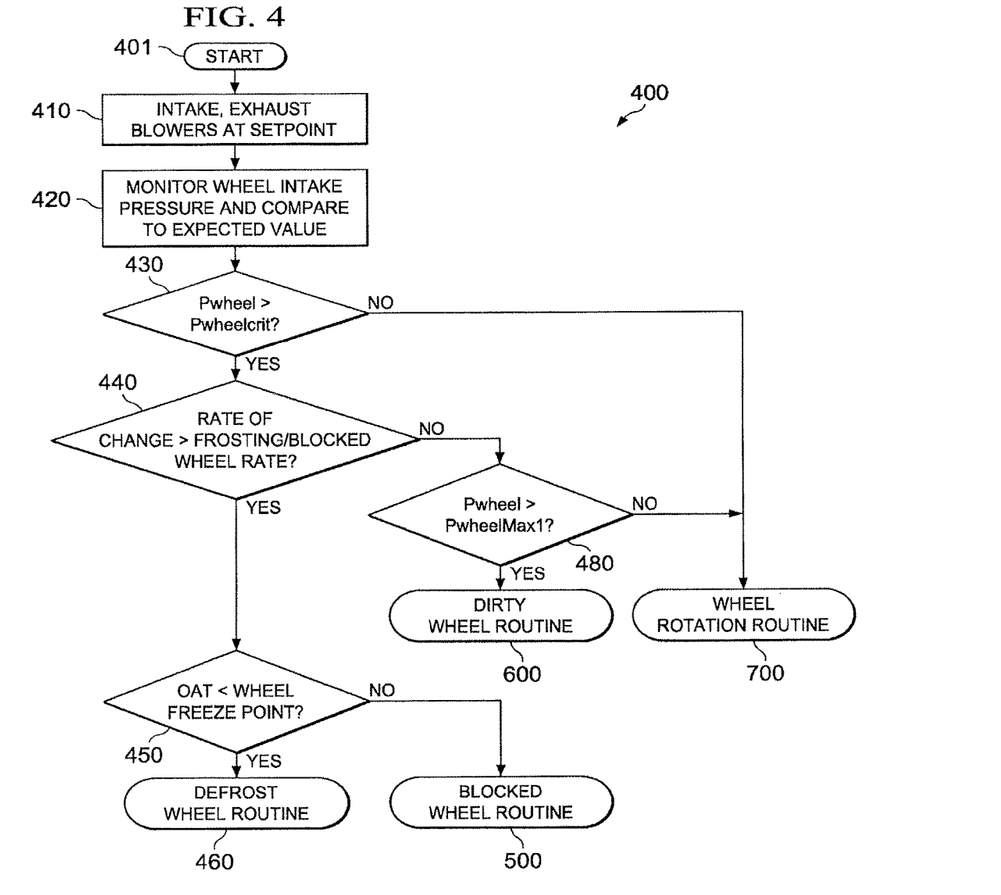
FIGS. 4-7 illustrate aspects of methods of operating the system of FIG. 1 according to one embodiment, the method including selecting one of a plurality of routines configured to attempt unblock an enthalpy wheel of the ERV of FIG. 1 or 2A-2B.

Turning initially to FIG. 4, the method 400 determines whether one or more of the enthalpy wheels 125a and 125b is frosted, blocked, dirty or not rotating, and if so respectively branches to routines 460, 500 600 or 700 for corrective action. The method 400 begins with an entry point 401. In a step 410, the blowers 115 and 120 are set to a test set point. The set point is not limited to any particular value, but it may be preferred to set the blowers 115, 120 to produce an airflow that results in a robust and consistent backpressure across the enthalpy wheels 125a and 125b.

In a step 420 the controller 195 determines a pressure within the enclosure 112, e.g. in zone II of the ERV 105. This pressure is referred to in various embodiments as Pwheel. The pressure Pwheel may be referenced to the pressure in zone I, e.g. atmospheric pressure, thereby providing the backpressure across the enthalpy wheels 125a and 125b. In various embodiments Pwheel is stored in the database 350 to create a pressure measurement history for later use in computing pressure trends.

The value of Pwheel is expected to be a well-behaved function of the blower 115 setpoint and of the constriction produced by the enthalpy wheel 125, at least over some range of airflow rates. See, e.g. the 'xxx application. The pressure may be related to the enthalpy wheel constriction by, e.g. a table of values provided by the enthalpy wheel 125 manufacturer, or by an empirical equation determined by the manufacturer of the system 100. Tabular data or equation parameters may be stored e.g. in the database 350. When Pwheel exceeds a threshold pressure one or both of the enthalpy wheels 125a, 125b may be presumed to be at least partially blocked. For example, an enthalpy wheel manufacturer may specify a value PwheelCrit at which wheel cleaning is recommended. A higher value, PwheelMax, may indicate a pressure at which the enthalpy wheel 125 may be damaged.

In a decisional step 430 the controller 195 compares Pwheel to PwheelCrit. If the Pwheel is not greater than PwheelCrit, the enthalpy wheels are presumed to be unblocked. The method 400 then branches to the method 800 to determine if the enthalpy wheels 125a and 125b are properly rotating. On the other hand, if Pwheel is greater than the PwheelCrit, the enthalpy wheels 125a, 125b are presumed to be blocked in some way, and the method 400 advances to a decisional step 440.

In the step 440, the controller 195 determines a rate of change of Pwheel, $\partial Pwheel/\partial t$. This calculation may make use of historical data stored in the database 350 as described earlier. The controller 195 compares $\partial Pwheel/\partial t$ to a static value FBrate that represents a rate of change consistent with a frosted or blocked enthalpy wheel.

Different causes of a blocked enthalpy wheel are expected to be associated with different values of $\partial Pwheel/\partial t$. For example, the enthalpy wheels 125a and/or 125b are expected to become dirty, if at all, at a relatively slow rate. For instance, without limitation, Pwheel may increase by 100% over the course of a year of normal operation due to accumulation of particles. On the other hand, if the enthalpy wheels 125a and/or 125b become frosted, Pwheel is expected to increase relatively rapidly, e.g. by 100% in less than one hour or even just a few minutes. Finally, if the enthalpy wheels 125a and/or 125b become blocked, e.g. by trash or a similar obstruction, Pwheel is expected to at least double in a matter of seconds. If $\partial Pwheel/\partial t$ is not greater than FBrate, then the enthalpy wheels 125a and 125b are presumed to be neither frosted nor blocked.

Therefore, in the step 440, the method 400 branches to a decisional step 480 when $\partial Pwheel/\partial t$ is not greater than the threshold value FBrate. In the step 480, the controller 195 compares Pwheel to another threshold value, PwheelMax1. If Pwheel>PwheelMax1, the enthalpy wheels 125a and 125b are presumed to be dirty, and the method 400 branches to the dirty wheel routine 700. On the other hand, if Pwheel<=PwheelMax1, then the enthalpy wheels 125a and 125b are presumed to be operating with an acceptable flow rate, and the method 400 in some embodiments branches to the method 800 to determine if the enthalpy wheels 125a and 125b are properly rotating. In other embodiments, not shown, the method 400 may instead return to the calling routine.

If at the step 440 $\partial Pwheel/\partial t$ is greater than the FBrate, the method 400 advances to a decisional step 450. At the step 450 the controller 195 determines if the outside air temperature (OAT) is less than a threshold temperature WheelFreeze. If the (OAT) is less than WheelFreeze, one or both of the enthalpy wheels 125a, 125b are presumed to be frosted, and the method 400 advances to the wheel defrost routine 460. Aspects of the wheel defrost routine 460 are beyond the scope of this description and are not described further. If at the step 450 (OAT) is not less than the WheelFreeze, the enthalpy wheels 125a and/or 125b are presumed to be blocked, and the method 400 branches to the blocked wheel routine 500.

Figures 5, 6:
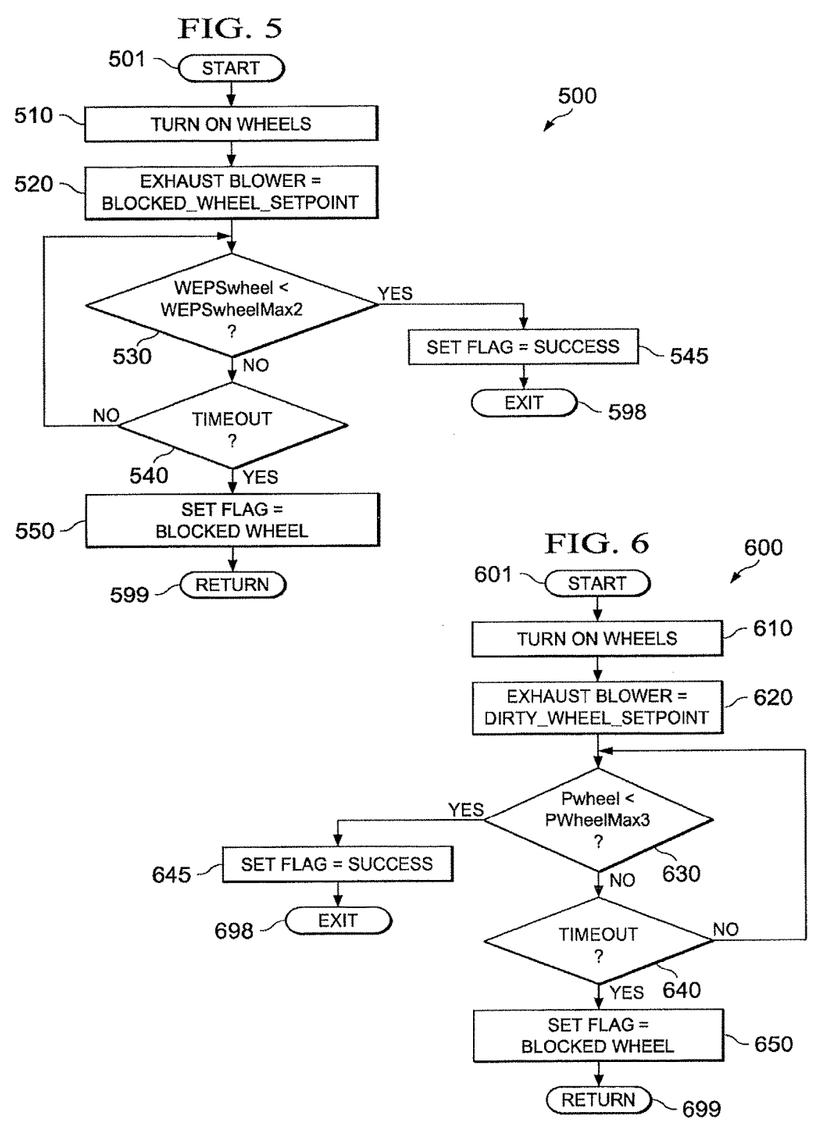

The method 400 branches from the step 450 to the blocked wheel routine 500 when (OAT) is not less than the presumed frosting temperature WheelFreeze. This condition represents the case in which the enthalpy wheels 125a and 125b are presumed to the unfrosted. The routine 500 is illustrated in FIG. 6 in one illustrative embodiment. In various embodiments the controller 195 determines via the routine 500 whether the enthalpy wheel 125 is blocked by an obstruction other than frost or dirt, e.g. trash such as a plastic sack. In the case of such an obstruction it is expected that the historical air pressure measured by the transducer 190 will indicate a value of $\partial Pwheel/\partial t$ that has a sudden increase of backpressure, e.g. a large increase of backpressure that occurs over a few seconds.

In a step 510 the controller 195 turns on the drive motors to the enthalpy wheels 125a and 125b if they are not already turning. In a step 520, the controller 195 sets the speed of the exhaust blower 120 to a value Blocked_Wheel_Setpoint. This speed may be, e.g. a value large enough to dislodge obstructing debris from the enthalpy wheels 125a and 125b. The controller 195 verifies that the exhaust wheel pressure WEPS does not exceed a set critical value WEPSmax, that if exceeded could damage the enthalpy wheels 125. If WEPS does exceed WEPSmax the controller 195 may reduce the operating setpoint of the exhaust blower 120 until the exhaust enthalpy wheel backpressure is below WEPSmax. The controller 195 may also initialize a timer to be used as described below.

In step 530 the controller 195 determines whether the exhaust backpressure WEPSwheel is less than a threshold pressure WEPSwheelMax2. WEPSwheelMax2 may or may not be about equal to PwheelMax1. If the pressure is not less than WEPSwheelMax2, the method 500 branches to a step 540 in which the controller 195 determines if the timer initialized in the step 520 has timed out. The timer may be set, e.g. to allow for one or more full rotations of the enthalpy wheels 125a and 125b to ensure that the presumed obstruction has been subjected to the force of the exhaust airstream 140a. If the timer has not expired, the method 500 returns to the step 530 to again test the value of Pwheel. The method 500 may continue to loop between the steps 530 and 540 until Pwheel drops below WEPSwheelMax2, or until the timer expires.

In the event that WEPS drops below WEPSwheelMax2, the obstruction is presumed to be removed and the method 500 advances to a step 545. The controller 195 sets a flag value at the step 545 to indicate the success of the removal and exits to the calling routine at a step 598. On the other hand, if the timer expires at the step 540 the method 500 advances to a step 550 at which the controller 195 sets a flag indicating the enthalpy wheel 125 is blocked and returns to the calling routine at a step 599.

Referring back to FIG. 4, if in the step 480 the Pwheel is greater than PwheelMax1, the enthalpy wheel 125 is presumed to be dirty, and the method 400 branches to the dirty wheel routine 600. FIG. 6 illustrates the method 600 in one illustrative embodiment. The method 600 begins at an entry point 601. In a step 610 the controller 195 energizes the motor that drive the enthalpy wheels 125a and 125b if they are not already energized. In a step 620 the controller 195 sets the speed of the exhaust blower 120 to a value Dirty_Wheel_Setpoint. In some cases it is expected that increasing the velocity of the exhaust air can dislodge and expel enough accumulated dirt, e.g. small particles, that the operation of the enthalpy wheels 125a and 125b may be restored to a useful state. Without limitation, in some embodiments the speed of the blower 120 is set to a maximum value that may be maintained without damage to the enthalpy wheels 125a and 125b, or to a maximum air speed provided by a the manufacturer of the enthalpy wheels 125a, 125b. In some embodiments the increase of the exhaust blower 120 speed is combined with a decrease of the speed of the intake blower 115 to, e.g. reduce the possibility that expelled particles are redirected to the enthalpy wheels 125a, 125b by the intake airstream. The controller 195 may also initiate a timer in the step 620.

In a step 630 the controller 195 determines whether the backpressure Pwheel across the enthalpy wheels 125a, 125b is less than a threshold pressure PwheelMax3. PwheelMax3 may or may not be about equal to PwheelMax1 and/or PwheelMax2. If the pressure is not less than PwheelMax3, the method 600 branches to a step 640 in which the controller 195 determines if the timer initialized in the step 620 has timed out. The timer may be set, e.g. to allow for one or more full rotations of the enthalpy wheel 125 to ensure that the entire surface of the enthalpy wheel 125 has been exposed to the exhaust airstream 140a at least once. The timer may allow the enthalpy wheels 125a, 125b to rotate one or more times before timing out. If the timer has not expired, the method 600 returns to the step 630 to again test the value of Pwheel. The method 600 may continue to loop between the steps 630 and 640 until Pwheel drops below PwheelMax3, or until the timer expires.

In the event that Pwheel drops below PwheelMax3, the dirt particles are presumed to be sufficiently removed and the method 600 advances to a step 645. The controller 195 sets a flag value at the step 645 to indicate the success of the removal and exits to the calling routine at a step 698. On the other hand, if the timer expires at the step 640 the method 600 advances to a step 650 at which the controller 195 sets a flag indicating the enthalpy wheel 125 is blocked. In a step 699 the method 600 returns to the calling routine.

The calling routine may, e.g. set an alarm condition indicating maintenance is needed to remove the accumulated particles or replace one or both enthalpy wheels 125a, 125b. The alarm may indicate generally that enthalpy wheel maintenance is needed, or may indicate specifically the nature of one or more maintenance issues determined by the method 400. Such an alarm may be, e.g. visual or audible, may be delivered via a wired or wireless network, may be or include an email, text message, or any other message delivery method.

Figure 7:
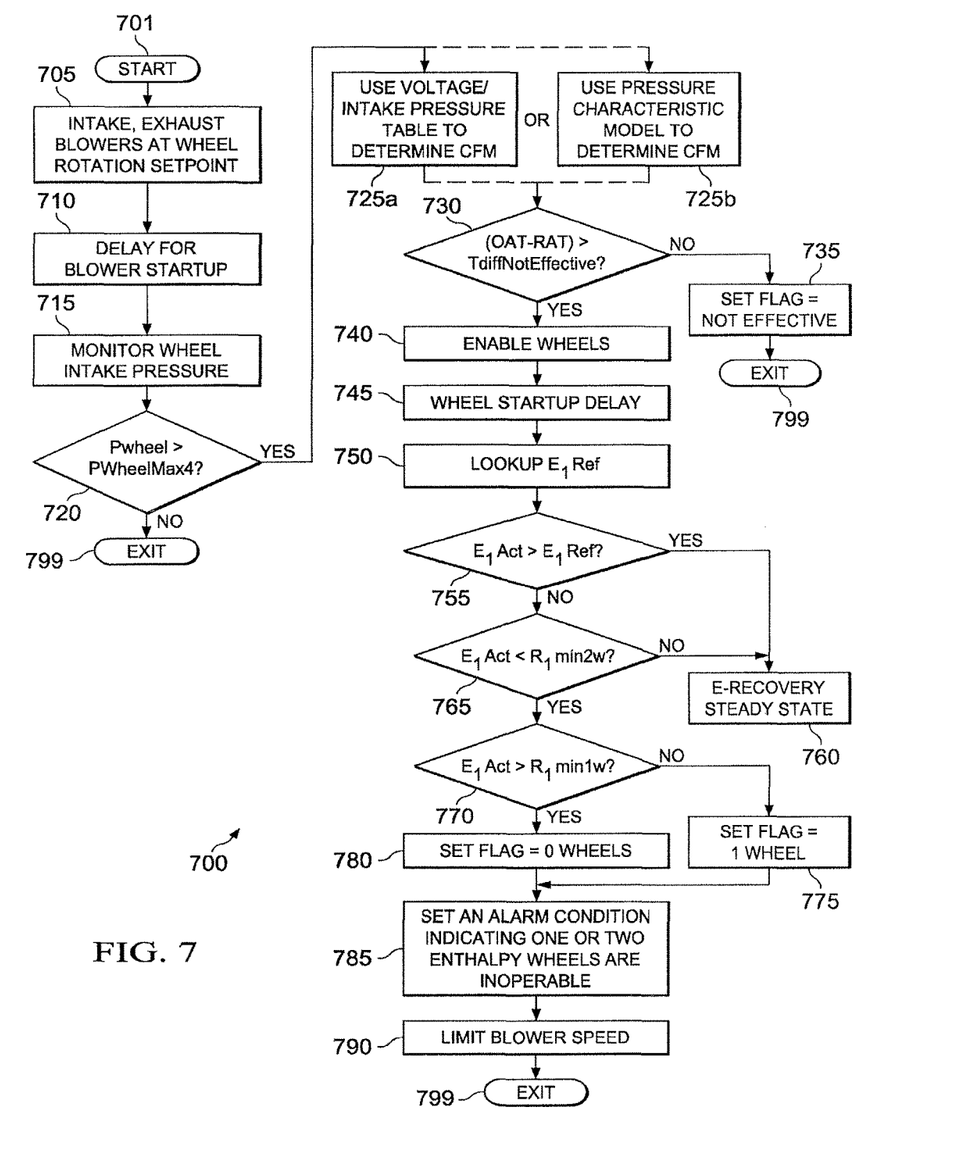

Referring back to FIG. 4, as previously described the method 400 may branch to the routine 700 from the step 430 when Pwheel is greater than the PwheelCrit, or from the step 480 when Pwheel>Pwheelmax1, to test for proper rotation of the enthalpy wheels 125a, 125b. FIG. 7 illustrates the method 700 a nonlimiting illustrative embodiment. Without limitation the method 700 is described for the case that the ERV 200 includes two enthalpy wheels. Those skilled in the pertinent art are able to adapt the method 700 for embodiments in which the ERV 200 includes other than two enthalpy wheels. Such embodiments are expressly included within the scope of the disclosure and the claims.

The method 700 begins at an entry point 701. In a step 705 the controller 195 sets the speed of the blowers 115 and 120 to an operating setpoint sufficient to measure the backpressure Pwheel across the enthalpy wheels 125a and 125b. The operating setpoint is not limited to any particular value, and may be the same or different from Dirty_Wheel_Setpoint and/or Blocked_Wheel_Setpoint. In a step 710 the controller 195 may wait for a duration sufficient to ensure that Pwheel has reached a stable value. In a step 715 the controller 195 determines Pwheel as measured by the transducer 190. Note that in various embodiments the enthalpy wheels 125a, 125b are not rotating in this step. In a decisional step 720 the controller 195 determines if Pwheel is greater than a threshold pressure PwheelMax4. PwheelMax4 may or may not be about equal to PwheelMax1, PwheelMax2 and/or Pwheelmax3. If Pwheel is greater than PwheelMax4 the method 700 branches to step 430 (FIG. 4). In some embodiments Pwheelmax4 is about the same value as PwheelCrit. Thus, the step 720 determines that the wheel is not frosted or blocked prior to advancing.

If in the step 720 Pwheel is greater than PwheelMax4, the controller 195 may determine a flow rate through the enthalpy wheels 125a, 125b by one of at least two alternate methods. Without limitation, two alternate steps 725a and 725b are described for determining this flow rate.

In a step 725a, the controller 195 uses a table relating the control voltage of the intake blower 115 and the value of Pwheel to the flow rate of air through the enthalpy wheels 125a, 125b. Necessary tabular data may be stored, e.g. in the database 350. Such a table may presume a relatively low level of obstruction of the enthalpy wheels 125a, 125b, so in some cases it may be preferable to use the table only when the enthalpy wheel is relatively new and/or has been recently cleaned by one of the methods described herein. Alternatively the method 700 may in the step 725b determine the airflow rate through the enthalpy wheels 125a, 125b using a pressure determined by a transducer (not shown) across the orifice ring of the blower 115 in a parameterized model of airflow through the enthalpy wheels 125a and 125b. The model parameters may be stored, e.g. in the database 350.

In a step 730 the controller 195 determines if a difference between a return air temperature (RAT) and the OAT is greater than a threshold temperature difference TdiffNotEffective. In the case RAT-OAT is not greater than TdiffNotEffective, the method 700 branches to a step 735 in which the controller 195 sets a flag indicating that temperature difference is not sufficient to allow for reliable determination of the wheel rotation state. For example, if RAT-OAT is small, the temperature difference may be too small to determine if the wheels are operating properly. If the RAT-OAT is greater than TdiffNotEffective the method 700 advances to a step 740.

In the step 740 the controller 195 enables rotation of the enthalpy wheels 125a and 125b, and waits in a step 745 to ensure the enthalpy wheels have achieved full rotational speed.

In a step 750 the controller 195 looks up a reference value $E_1Ref$. $E_1Ref$ is the expected effectiveness of the wheel given all of the inputs, e.g. air flow and the temperatures of zone I and zone III. Knowledge of these values may allow a prediction of an expected effectiveness of the enthalpy wheels and an expected temperature of zone II. In a step 755 the controller 195 determines if $E_1Act$ is greater than $E_1Ref$. If so, the method 700 branches to a step 760, referred to E-recovery. In the E-recovery state the ERV 105 may operate normally, e.g. in response to a call from the RTU to operate, and may continue to operate while no alarms are present. If $E_1Act$ is not greater than $E_1Ref$, the method proceeds to a step 765, in which the controller 195 determines if $R_1Eff$ is less than $R_1min2w$. The value $R_1min2w$ is a parameter that describes the expected flow resistance of the ERV 105 when two enthalpy wheels 125 are operating. If this condition is not true the method 700 again advances to the step 760 and the ERV 105 operates normally. The method 700 may exit the step 760 (the E-recovery state) if the conditioning unit 110 does not have an occupied signal. In this case in various embodiments the ERV 105 will not turn on, e.g. will be in an idle mode. In some embodiments, the ERV 105 may be operating in a safe mode.

If in the step 765 $R_1eff<R_1min2w$ then the method 700 advances to a decisional step 770. In the step 770 the controller 195 tests whether $R_1eff$ is greater than $R_1min1w$ to determine if the ERV 105 is operating with more than one enthalpy wheel 125. If $R_1eff$ is not greater than $R_1min1w$, the method 700 branches to a step 775 and sets a status flag to indicate that only one wheel is rotating. In instead $R_1eff>R_1min1w$ in the step 770, the method advances to a step 780 and sets the status flag to indicate that neither of the enthalpy wheels 125a, 125b are rotating.

In some embodiments the method 700 advances from the step 775 and the step 780 to a step 785 in which an alarm condition may be set to indicate the inoperability of one or both of the enthalpy wheels 125a, 125b. As before, such an alarm may be, e.g. visual or audible, may be delivered via a wired or wireless network, may be or include an email, text message, or any other message delivery method.

In some embodiments the method 700 may also include a step 790 following the step 780, in which the speed of one or both of the blowers 115, 120 is reduced from a maximum available level. Such reduction may be, e.g., proportional to a reduction of heat transfer capacity that results from the loss of operability of one or both of the enthalpy wheels 125a, 125b. The method then returns to the calling routine via a step 799.

Figure 8:
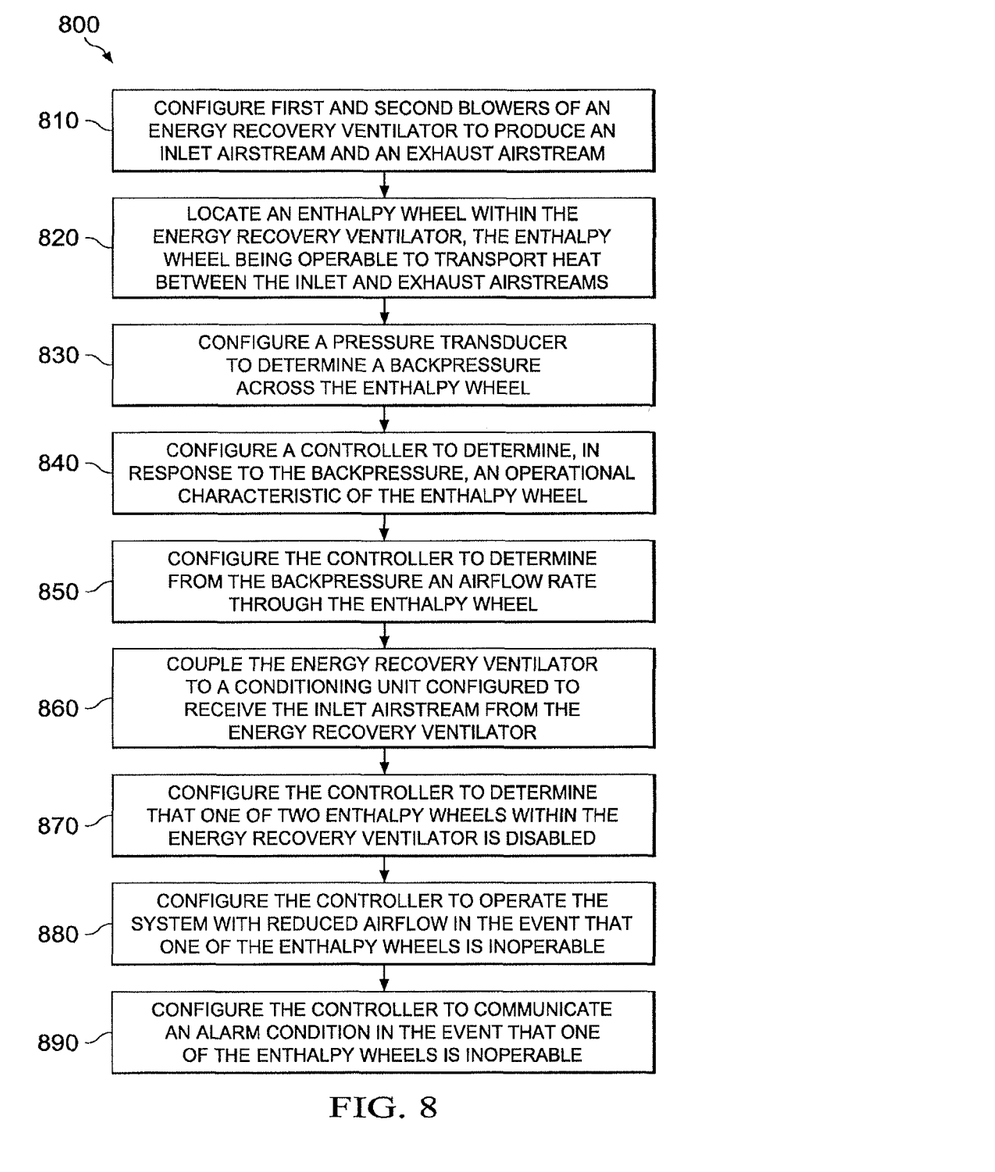
FIG. 8 illustrates a method of manufacturing an HVAC system in one embodiment, e.g. the system of FIG. 1 as further developed in FIGS. 2 and 3.

Turning to FIG. 8, a method 800 is illustrated for manufacturing an HVAC system in a nonlimiting illustrative embodiment. The method 800 is described without limitation with reference to features previously described with respect to the system 100, e.g. in FIGS. 1, 2A, 2B and 3. The steps of the method 800 may be performed in another order than the illustrated order.

In a step 810 first and second blowers of an energy recovery ventilator, e.g. the blowers 115, 120, are configured to produce an inlet airstream and an exhaust airstream, e.g. the airstreams 135a and 140a. In a step 820 an enthalpy wheel, e.g. the enthalpy wheel 125, is located within the energy recovery ventilator. The enthalpy wheel is operable to transport heat between the inlet and exhaust airstreams. In a step 830 a pressure transducer, e.g. the transducer 190, is located configured to determine a backpressure across the enthalpy wheel. In a step 840 a controller, e.g. the controller 195, is configured to determine an operational characteristic of the enthalpy wheel in response to the backpressure.

In a step 850 the controller is configured to determine an airflow rate through the enthalpy wheel from the pressure.

In a step 860 the energy recovery ventilator is coupled to an air conditioning unit, with the air conditioning unit being configured to receive the inlet airstream from the energy recovery ventilator.

In a step 870 the enthalpy wheel is one of two enthalpy wheels within the energy recovery ventilator. The controller is further configured to determine that rotation of one of the enthalpy wheels is disabled.

In a step 880 the controller is configured to operate the HVAC system with reduced airflow in the event that one of the enthalpy wheels is inoperable.

In a step 890 the controller is configured to activate an alarm condition in the event that one of the enthalpy wheels is inoperable.

Those skilled in the art to which this application relates will appreciate that other and further additions, deletions, substitutions and modifications may be made to the described embodiments.

What is claimed is:

1. A method for heating, ventilating, and cooling comprising:
determining an outside air temperature;
recording a rate of change of pressure in a region of an energy recovery ventilator, wherein the energy recovery ventilator is operable to produce an inlet airstream and an exhaust airstream;
determining that an enthalpy wheel positioned within the energy recovery ventilator and operable to transport heat between the inlet and exhaust airstreams is in a frosted condition if the rate of change of air pressure within the energy recovery ventilator is greater than a stored normal rate of change of air pressure and the outside air temperature is below a stored temperature value;
determining that the enthalpy wheel is in a disabled condition if the rate of change of the air pressure within the energy recovery ventilator is greater than the stored normal rate of change of air pressure and the outside air temperature is higher than the stored temperature value; and setting the operating speed of an exhaust blower to a predetermined speed based on the determined condition of the enthalpy wheel.

2. The method as recited in claim 1, wherein the energy recovery ventilator is operable to produce the inlet airstream by drawing outside air into the energy recovery ventilator.

3. The method as recited in claim 1, further comprising:
measuring air pressure within at least a region of the energy recovery ventilator;
determining a pressure differential across the enthalpy wheel based, at least in part, upon the measured air pressure; and
determining an airflow rate through the enthalpy wheel based, at least in part, upon the pressure differential.

4. The method as recited in claim 1, wherein the enthalpy wheel is one of two enthalpy wheels within the energy recovery ventilator, and the method further comprises determining that one of the enthalpy wheels is disabled.

5. The method as recited in claim 1, further comprising directing the inlet airstream into a conditioning unit coupled to the energy recovery ventilator.

6. The method as recited in claim 4, further comprising reducing airflow of the inlet and exhaust airstreams in the event that one of the enthalpy wheels is inoperable.

7. The method as recited in claim 4, further comprising communicating an alarm condition in the event that one of the enthalpy wheels is inoperable.

\* \* \* \* \*